(12) United States Patent
Chenillo et al.

(10) Patent No.: US 10,271,095 B1
(45) Date of Patent: Apr. 23, 2019

(54) SYSTEM AND METHOD FOR MEDIA SEGMENT INDENTIFICATION

(71) Applicants: Samuel Chenillo, New York, NY (US); Oren Steinfeld, Kfar Saba (IL)

(72) Inventors: Samuel Chenillo, New York, NY (US); Oren Steinfeld, Kfar Saba (IL)

( * ) Notice: Subject to any disclaimer, the term of this patent is extended or adjusted under 35 U.S.C. 154(b) by 0 days.

(21) Appl. No.: 16/110,265

(22) Filed: Aug. 23, 2018

Related U.S. Application Data

(63) Continuation-in-part of application No. 15/852,389, filed on Dec. 22, 2017, now Pat. No. 10,096,169.

(60) Provisional application No. 62/608,666, filed on Dec. 21, 2017.

(51) Int. Cl.
| | | |
|---|---|---|
| G06K 9/00 | (2006.01) | |
| H04N 21/44 | (2011.01) | |
| H04N 21/439 | (2011.01) | |

(52) U.S. Cl.
CPC ... *H04N 21/44008* (2013.01); *G06K 9/00744* (2013.01); *G06K 9/00758* (2013.01); *H04N 21/4394* (2013.01)

(58) Field of Classification Search
None
See application file for complete search history.

(56) References Cited

U.S. PATENT DOCUMENTS

| | | | | |
|---|---|---|---|---|
| 6,956,904 | B2 * | 10/2005 | Cabasson | G06F 17/30787 348/699 |
| 7,881,657 | B2 | 2/2011 | Wang et al. | |
| 8,190,435 | B2 | 5/2012 | Li-Chun Wang | |
| 8,996,557 | B2 * | 3/2015 | Koishida | G06F 17/30743 707/765 |
| 9,621,929 | B1 * | 4/2017 | Chenillo | H04N 21/23424 |
| 2004/0088723 | A1 * | 5/2004 | Ma | G06F 17/30787 725/19 |
| 2010/0278419 | A1 * | 11/2010 | Suzuki | G06F 17/30787 382/155 |
| 2015/0317801 | A1 * | 11/2015 | Bentley | H04N 7/181 382/107 |

* cited by examiner

*Primary Examiner* — Hadi Akhavannik
(74) *Attorney, Agent, or Firm* — r.r (princeton); Roy Rosser

(57) ABSTRACT

A system and method for identifying media segments using audio augmented image cross-comparisoning is disclosed, in which a media segment identifying system analyzes both audio and video content, producing a unique identifier to compare with previously identified media segments in a media segment database. The characteristic landmark-linked-image-comparisones are constructed by first identifying pairs of audio landmarks separated by a characteristic, or landmark, time. Digital images associated the audio landmarks are then image comparisoned, with the combination providing a characteristic landmark-linked-image-comparison. The audio landmarks are audio peaks that exceed predetermined thresholds. A landmark-time is the time between adjacent pairs of audio peaks. The pair of images associated with the audio peaks are reduced in pixel size and converted to gray scale. Corresponding pixels are compared to form a numeric comparison. One image may be mirrored before comparison to reduce the possibility of null comparisones.

17 Claims, 3 Drawing Sheets

SYSTEM AND METHOD FOR MEDIA SEGMENT INDENTIFICATION

CROSS-REFERENCE TO RELATED APPLICATIONS

This application claims priority to U.S. patent application Ser. No. 15/852,389 filed on Dec. 22, 2017 entitled "System for the Augmented Assessment of Virtual Insertion Opportunities" and to US Provisional Patent Application No. 62/608,666 filed on Dec. 21, 2017 entitled "Augmented Virtual Video-Insertion", the contents of both of which are hereby fully incorporated herein by reference.

BACKGROUND OF THE INVENTION

(1) Field of the Invention

The invention relates to a system and method for automatically identifying media segments, and more particularly to using an audio enhanced image comparison to compare media segments to a database of previously identified media segments.

(2) Description of the Related Art

The technical problem of automatically identifying media segments is inherent in the technical fields of media distribution and monitoring, and may be used for purposes such as, but not limited to, scheduling, billing, and rights protection.

Attempting to match images using pixel by pixel comparison can be computationally expensive, especially if the image is being sought in a real-time broadcast, or streaming, of high definition television images. In the case where the objective may be to find an occurrence of a particular reference image, or images, in a broadcast stream, errors of omission may, for instance, occur if the broadcast stream has been altered, either by resizing, or by color filtering.

What is needed is a system and method that can reliably, robustly, and computationally efficiently, identify video image segments in a real time digital media content stream.

The relevant prior art includes:

U.S. Pat. No. 7,881,657 issued to Wang, et al. on Feb. 1, 2011 entitled "Method for high-throughput identification of distributed broadcast content" that describes a method and system of performing high-throughput identifications of broadcast content. A device is disclosed that can send a content identification query, which includes a sample of content being broadcast, to a server to request an identity of the content. The server will perform a computational identification of the content, return the result to the device, and store the result. For all subsequently received content identification queries requesting an identity of content being broadcast from the same source and in a time during which the content is still being broadcast from the source, the server will send the stored content identification in response to the subsequent queries. If a subsequent content identification query does not request the identity of content being broadcast from the same source or is not received during the time that the content is still being broadcast, the server will perform a computational identification of a content sample.

U.S. Pat. No. 8,190,435 issued to Li-Chun Wang, et al. on May 29, 2012 entitled "System and methods for recognizing sound and music signals in high noise and distortion" that describes a method for recognizing an audio sample that locates an audio file that most closely matches the audio sample from a database indexing a large set of original recordings. Each indexed audio file is represented in the database index by a set of landmark-time points and associated fingerprints. Landmarks occur at reproducible locations within the file, while fingerprints represent features of the signal at or near the landmark-time points. To perform recognition, landmarks and fingerprints are computed for the unknown sample and used to retrieve matching fingerprints from the database. For each file containing matching fingerprints, the landmarks are compared with landmarks of the sample at which the same fingerprints were computed. If a large number of corresponding landmarks are linearly related, i.e., if equivalent fingerprints of the sample and retrieved file have the same time evolution, then the file is identified with the sample. The method can be used for any type of sound or music, and is particularly effective for audio signals subject to linear and nonlinear distortion such as background noise, compression artifacts, or transmission dropouts. The sample can be identified in a time proportional to the logarithm of the number of entries in the database; given sufficient computational power, recognition can be performed in nearly real time as the sound is being sampled.

Various implementations are known in the art, but fail to address all of the problems solved by the invention described herein. Various embodiments of this invention are illustrated in the accompanying drawings and will be described in more detail herein below.

BRIEF SUMMARY OF THE INVENTION

An inventive system and method for automatically identifying media segments using audio-augmented, image-cross-comparison is disclosed.

In a preferred embodiment, a media segment identifying system, that may include one or more software modules operable on a digital processor, may automatically and efficiently analyze digital media content streams in real-time by combining an analysis of both the audio and video content to produce a unique identifier that can be compared with data in a media segment database. The media segment database may, for instance, contain characteristic landmark-linked-image-comparisons of previously identified media segments. The characteristic landmark-linked-image-comparisons may, for instance, be constructed by first examining the audio stream to identify pairs of audio landmarks, or fingerprints, temporally separated by what may be termed a landmark-time. Digital images associated with the audio landmarks may then be image-compared to provide a characteristic landmark-linked-image-comparison that may be used to identify the media segment.

For instance, in one embodiment of the invention, the audio landmarks may be audio peaks that exceed predetermined thresholds. Adjacent pairs of these may be characterized by the time that separates them, which may be termed a landmark-time. A pair of images, each occurring in the associated video stream at the same time as one of the audio peaks, and, therefore, separated in time by the landmark-time, may then be compared by first reducing them to reduced pixel size images, the corresponding pixels of which may be compared, and a numeric comparison formed based on that comparison.

In one particular example of the method of the invention, a digital multimedia stream may have both a digital image stream and an associated audio stream. A segment of the audio stream may then be examined to obtain adjacent audio peaks, each of which may, for instance, be three times, or more, as high as the audio level in the preceding 0.25 seconds. Two images may then be selected from the associated digital image stream, each associated with one of the detected audio peaks. These images may, for instance, then be reduced to 64-pixel, gray scale images. Corresponding pixels of each of reduced images may then be compared. The image-comparison may take the following form. If the first has a greater value than the second, a "1" may be recorded, else if the first is less than or equal to the second, a "0" may be recorded. In this way, a 64-bit number, the image-cross-comparison, may be constructed. Together with the landmark-time, i.e., the time between the adjacent audio peaks, this may constitute the landmark-linked-image-comparison of the digital, multimedia segment. This landmark-linked-image-comparison may then be used as a unique identifier for that multimedia segment it is associated with.

Therefore, the present invention succeeds in conferring the following, and others not mentioned, desirable and useful benefits and objectives.

It is an object of the present invention to provide a practical method of identifying video segments in multimedia streams that may be used for purposes such as, but not limited to, ensuring content was delivered as required, or detecting when unauthorized content is being delivered.

It is another object of the present invention to provide a method of identifying digital media segments that is computationally efficient and may, therefore, be implemented using modestly powered digital processors.

DETAILED DESCRIPTION OF THE INVENTION

Figure 1:
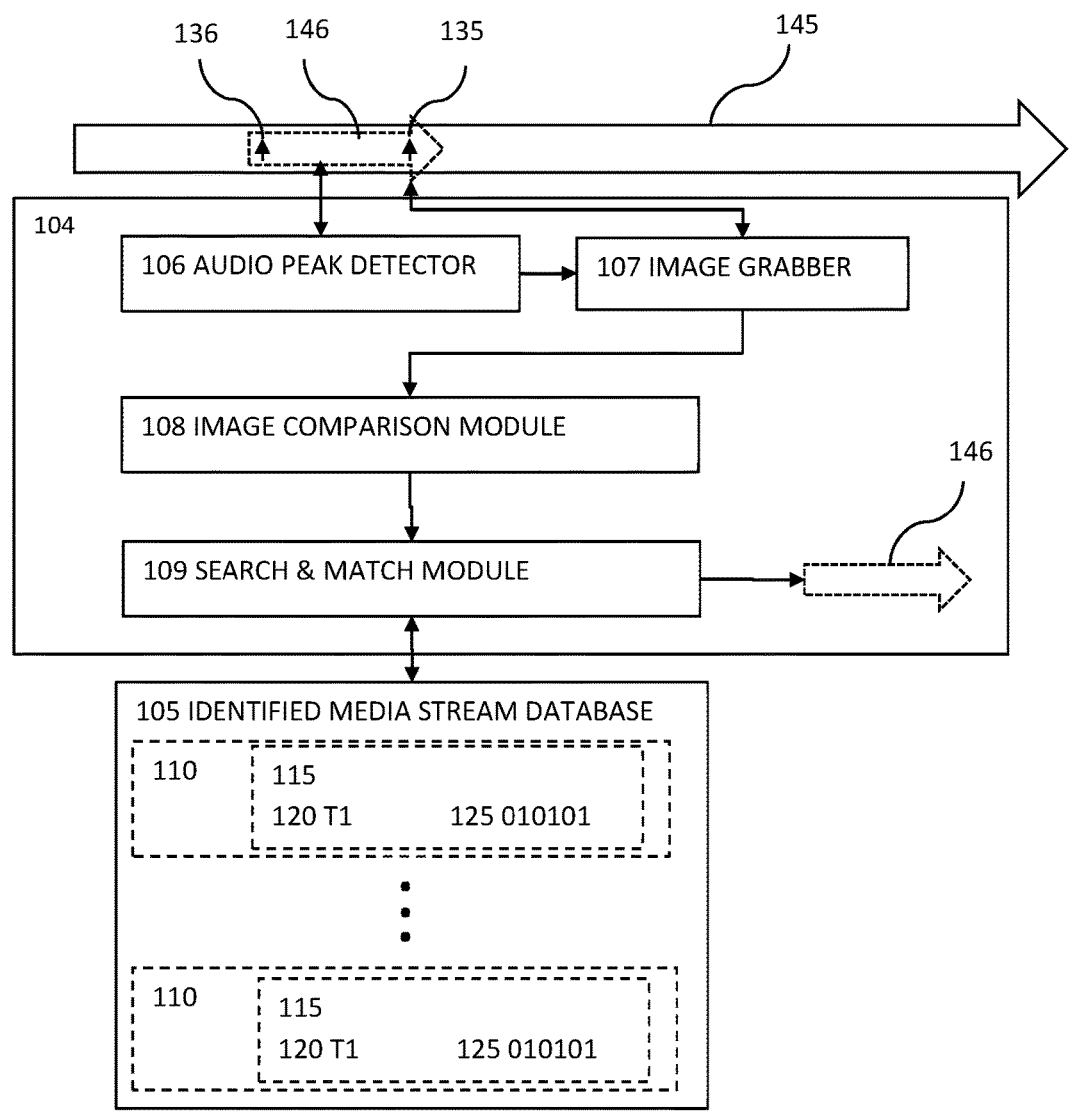
FIG. 1 shows a schematic representation of a system for media segment identification of one embodiment of the present invention.

The preferred embodiments of the present invention will now be described in more detail with reference to the drawings in which identical elements in the various figures are, as far as possible, identified with the same reference numerals. These embodiments are provided by way of explanation of the present invention, which is not, however, intended to be limited thereto. Those of ordinary skill in the art may appreciate upon reading the present specification and viewing the present drawings that various modifications and variations may be made thereto without departing from the spirit of the invention.

FIG. 1 shows a schematic representation of a system for media segment identification of one embodiment of the present invention.

As shown in FIG. 1, the system 100 may obtain a digital multimedia stream 145 that may, for instance, be a television broadcast, or a digital stream, that may be of one or more events, or programs. The digital multimedia stream 145 may, for instance, contain interstitial advertising in the form of one or more media segments. An end user may be desirable of identifying that interstitial advertising for a variety of reasons, such as, but not limited to, to ensure that it was timely broadcast. or streamed, to substitute it out, to eliminate it, or some combination thereof.

In a preferred embodiment, the system 100 may include a digital processor 104, and one or more software modules operable on the digital processor 104, such as, but not limited to, an audio peak detector 106 and an image grabber 107. The audio peak detector 106 may, for instance, examine a current media segment 146 of the digital multimedia stream 145 to automatically identify a first audio peak 135 and a second audio peak 136. An audio peak may, for instance, be an audio level maximum that is a predetermined height greater than any audio level that precedes it in a predetermined length of time. The image grabber 107 may then automatically obtain images from the current media segment 146 corresponding in time to the positions of the audio peaks.

The images grabbed by the image grabber 107 may then be fed to an image-comparison module 108. The image comparison module 108 may automatically first reduce the images to more a manageable representation. For instance, the image may first be converted to a gray scale image, then reduced to an 8 by 8, 64-bit image. After reducing the images, the image comparison module 108 may then perform an image-comparison. In the image-comparison, pixels of the images may be compared with in order to produce a binary string that is characteristic of that image. For instance, pixels values of adjacent pixels may be compared, and if a pixel is equal to, or greater, in value than an immediately adjacent pixel, a "1" may be scored. If, however, the pixel is lower in value than the immediately adjacent pixel, a "0" may be scored. In this way, the image may be reduced to a 64-bit binary string, that may also be a binary number, that may be uniquely representative of that particular image.

Comparing each image in a video stream may be too computationally expensive for many applications. In a preferred embodiment of the present invention, the computational expense may be reduced by only comparing the images corresponding to the audio peaks. In an even more preferred embodiment, this comparison may take the form of an image-cross-comparison. In such an arrangement, the comparison may take the form of comparing the reduced, gray scale pixels in the first image, to reduced, gray scale pixels in the second image. The comparison may be between corresponding pixels, or between pixels displaced one or more pixels from the corresponding ones. In a further embodiment, one of the images may be mirrored prior to comparing the pixels. In this way, a current media segment 146 may be represented by two numbers: the landmark-time, which may be time length between the audio peaks, and the image-cross-comparison. Combined, the landmark-time and the image-cross-comparison, may be termed landmark-linked-image-comparison, and may represent a unique identifier for the current media segment 146.

The current media segment 146 may be defined by the audio peaks, or it may be a segment defined by one or more image boundaries, such as, but not limited to, image cuts, fades, or other detectable image transitions. The current media segment 146 may, for instance, have been determined using techniques such as those used to obtain candidate clips, as described in, for instance, U.S. patent application Ser. No. 15/852,389 filed on Dec. 22, 2017 entitled "System for the Augmented Assessment of Virtual Insertion Opportunities", the contents of which are hereby fully incorporated herein by reference.

The search and match module 109 may then use the landmark-linked-image-comparison to automatically ascertain whether or not the current media segment 146 matches a previously identified media segment. This may, for instance, be accomplished by searching a media segment database 105. The media segment database 105 may contain one or more previously identified media segments 110. These previously identified media segments 110 may each be associated with a landmark-linked-image-comparison 115 that is unique to, or characteristic, of them. A landmark-linked-image-comparison 115 may be made up of items such as, but not limited to, a landmark-time 120, and an image-cross-comparison 125. Each previously identified media segments 110 may also be associated with additional data such as, but not limited to, an identity of a rights holder of that media segment, an action to be performed when a match to the segment is found, or some combination thereof.

If the current media segment 146 matches one of the previously identified media segments 110 currently stored in the media segment database 105, it may be automatically tagged for later appropriate action. That tag may take a form such as, but not limited to, a database address, a URL, an email address, an identity of a rights holder, or some combination thereof. The appropriate action may be one such as, but not limited to, automatically sending an automated message to an identified rights holder to inform them that their media segment aired on a particular channel at a particular time, or it may be to automatically instruct a media delivery system to switch what media it is delivering.

Figure 2:
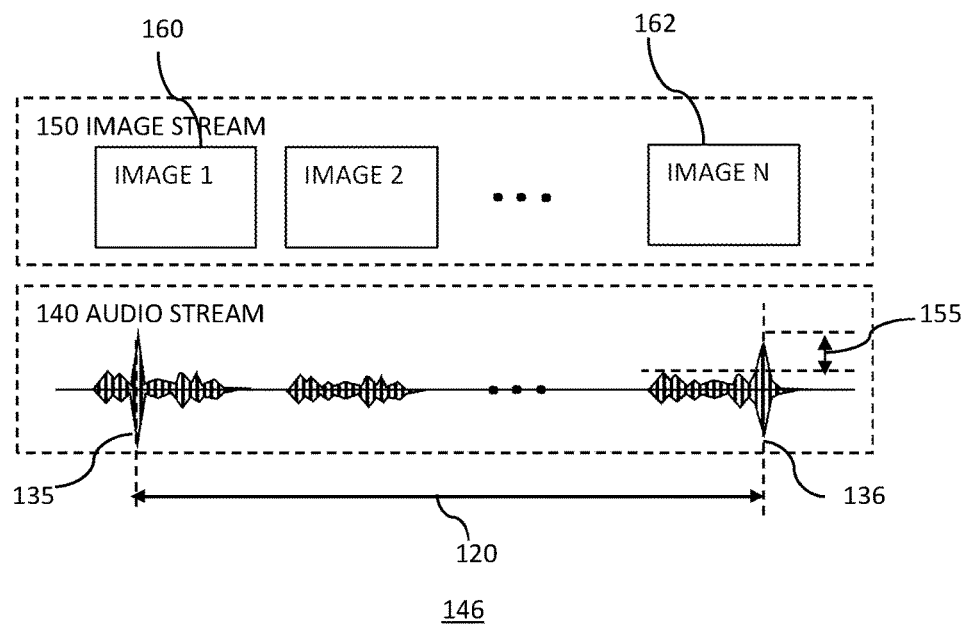
FIG. 2 shows a schematic representation of a current media segment.

FIG. 2 shows a schematic representation of a current media 146.

As represented in FIG. 2, a current media segment 146 may include both a digital image stream 150 and a digital audio stream 140. As described above, the audio stream 140 may be automatically examined, using software modules operable on a digital processor, to find pairs of audio peaks. The first audio peak 135 and the second audio peaks 136 may both be where the audio level attains a magnitude that may be a predetermined height 155 greater than any audio level in a predetermined length of time of adjacent audio. The predetermined height may, for instance, be 3-times or more as high, and the predetermined length of time may be 0.25 seconds. One of ordinary skill in the art will, however, appreciate that such values may depend on the nature of the content, and may be varied without detracting from the inventive concept. The lower limit of the predetermined height may, for instance, be in a range from 1.5 times to 5 times. Similarly, the predetermined length of time may be as little as 0.1 second to as long as 1 second, or even 2 or 3 seconds.

The length of time between the audio peaks may be designated as the landmark-time 120, and may represent one of the identifying characteristics of the current media segment 146.

As shown in FIG. 2, there may be images in the digital image stream 150 that may correspond in time to the audio peaks in the audio stream 140. For instance, a first image 160, may be associated with, i.e., occur at the same point in time during the broadcast, or streaming, as a first audio peak 135. Similarly, a second image 162, may be associated with a second audio peak 136. These images associated with the audio peaks may be the images automatically grabbed, and used, by software modules operable on the digital processor, for cross-comparison. The cross-comparison may then provide the image-cross-comparison that may be used in the characteristic landmark-linked-image-comparisons that may be used to identify media segments.

Figure 3:
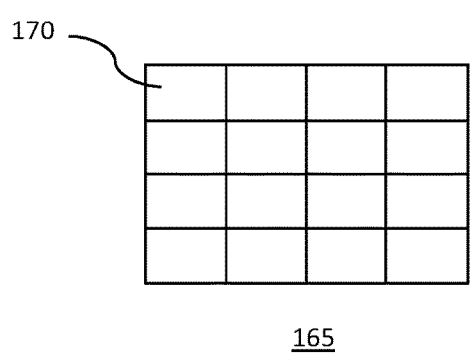
FIG. 3A shows a schematic representation of a reduced size image of one embodiment of the present invention.
FIG. 3B shows a schematic representation of a foveal reduced image of one embodiment of the present invention.
Figure 3:
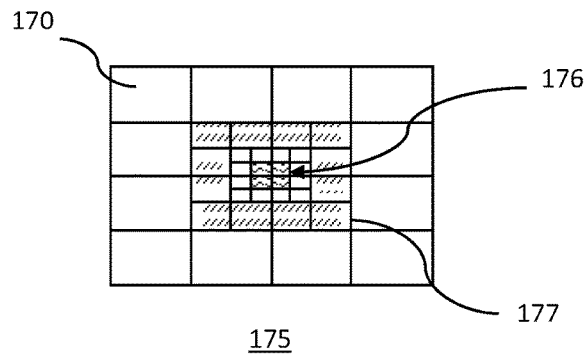

FIG. 3A shows a schematic representation of a reduced size image of one embodiment of the present invention.

The reduced size image 165 may be automatically obtained from an original, high resolution color image by first reducing the image from a color scale to a gray scale, and then reducing the number of pixels in the image by averaging values within predetermined areas.

In digitized RGB color images, each pixel is typically represented as three, 8-bit bytes, while in digital gray scale images, each pixel is typically represented by a single 8-bit byte. Operating on images that have been converted from RGB color images to gray scale images may, therefore, reduce the subsequent computational requirements by a factor of 3.

High definition television images typically have image sizes of either 1920×1080 pixels, or 1280×720 pixels, i.e. about 1-2 million pixels. Meaningfully useful images may be produced by reducing the total number of pixels down to around 50-100 pixels. This may result in a possible reduction of subsequent computation requirements by a factor of about 100,000. The terms a reduced size image, or a reduced image, is used within this application to refer to an image in which the number of pixels has been reduced. For instance, the original image may be a 1280 by 1080-pixel image, having a total of 1,382,400-pixels. The reduced size image may then be an 8 by 8-pixel image having a total of 64 pixels.

The reduced size image 165 displayed in FIG. 3A is intended to shown an image having equally sized, gray scale pixels 170. For convenience, the reduced size image 165 in FIG. 3A is shown to be a 4-by-4-pixel image. More typically, the images are only reduced to 8-by-8-pixel images. These equally sized pixels may, for instance, be obtained by averaging the values of pixels from the original image that fall within the area of a pixel of the reduced size image.

When performing image-comparison during image-cross-comparison, either corresponding pixels may be compared, or displaced pixels may be compared. The degree of displacement may be arbitrary, though typically a displacement by either one pixel horizontally or vertically may be preferable. The displacement may ensure that two very similar images do not produce a null cross comparison, i.e., one in which most, or all, the values are "1", representing nearly identical images.

Alternately, one of the reduced images may be mirrored prior to image-comparison, i.e., the (1,1) pixel may be compared to what was the (N, 1) pixel, the (2, 1) to the (N−1, 1) etc., where N is the total number of pixels in a row of pixels. This may ensure that two very similar images do not produce a null cross comparison, i.e., one in which most, or all, the values are "1", representing nearly identical images.

FIG. 3B shows a schematic representation of a foveal reduced image of one embodiment of the present invention.

In the foveal reduced image 175, each of the pixels 170 in the reduced image may not be of equal size. Instead there may, for instance, be a pixel core 176, surrounded by one or more rings 177 of slightly larger pixels. In this way, more accuracy may be obtained with video sequences in which a significant amount of the changes in the image are concentrated towards the center of the image, as in, for instance, talking head presentations as occur frequently in news related broadcasts.

In one embodiment, the foveal reduced image 175 may have an N by N pixel core 176 surrounded by M rings 177 of 2N(N+1) pixels, wherein N and M are positive integers. In a particular example, each of said first and second reduced size images may be a foveal reduced image having a 2-pixel by 2-pixel core surrounded by 3 rings of 12 pixels.

Image-comparison of the foveal reduced images to produce an image-cross-comparison may, for instance, be accomplished by comparing corresponding reduced images, or it may be done by comparing corresponding pixels after mirroring one of the reduced images. The mirroring of one of the reduced images may ensure that two very similar images do not produce a null cross comparison, i.e., one in which most, or all, the values are "1", representing nearly identical images.

Figure 4:
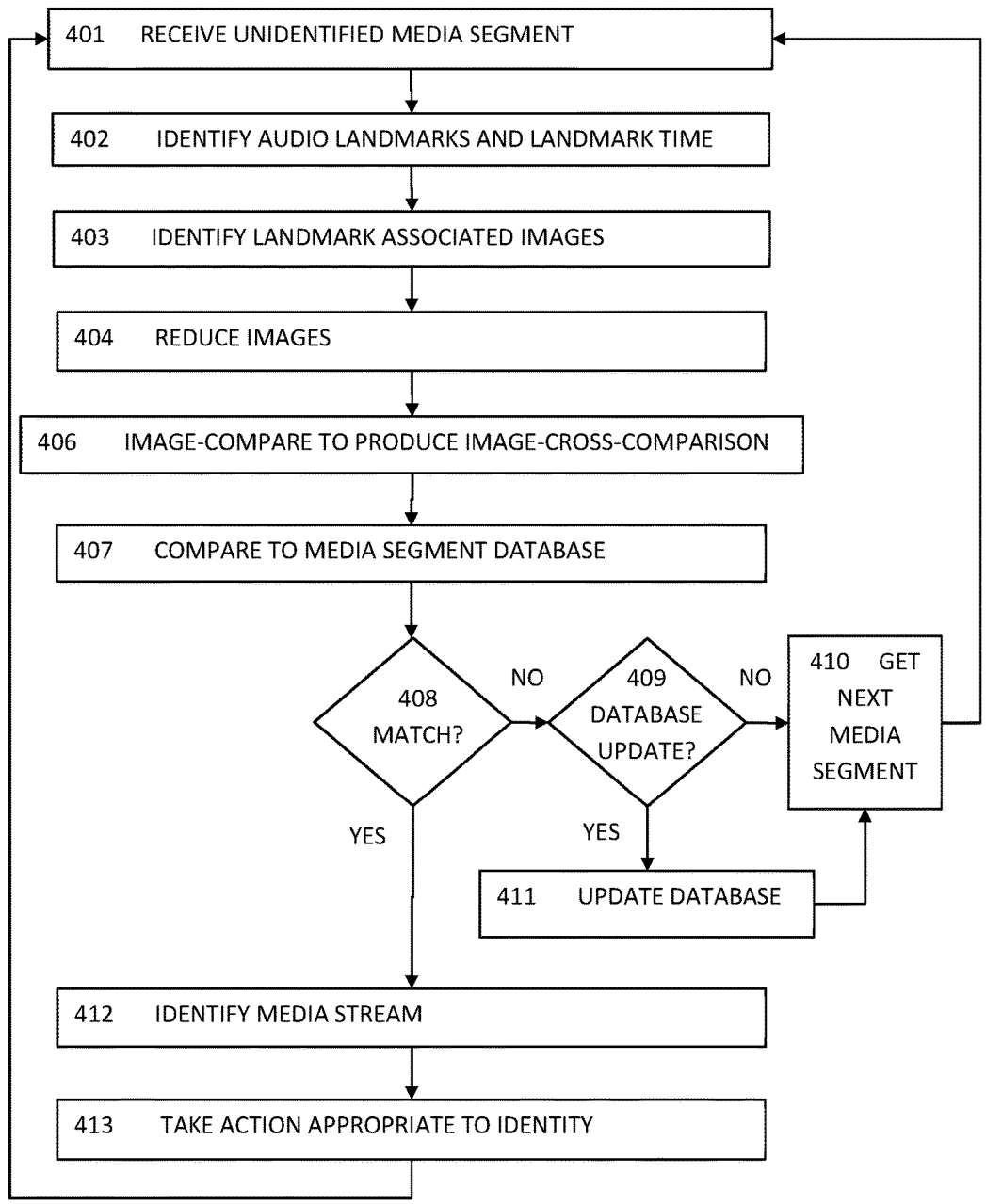
FIG. 4 shows a schematic flow diagram of representative steps of a system for media segment identification of one embodiment of the present invention.

FIG. 4 shows a schematic flow diagram of representative steps of a system for media segment identification of one embodiment of the present invention.

In Step 401, "RECEIVE UNIDENTIFIED MEDIA SEGMENT", a current, unidentified media segment may be obtained from a digital multimedia stream that may have both a digital image stream and an associated digital audio stream.

In Step 402 "IDENTIFY AUDIO LANDMARKS AND LANDMARK-TIME", the audio portion of the current media segment may be examined to obtain two or more audio peaks. An audio peak may, for instance, be a location in time of an audio maximum that is a predetermined height greater than any audio level of the audio track in a preceding, predetermined length of time. It may also have to exceed an audio level of the subsequent audio level in the digital audio stream for a second, predetermined length of time. In one, specific example, the predetermined height may be at least 3 times, or more, as high, and said predetermined time may be for at least 0.25 seconds.

The landmark-time may be the temporal difference between the occurrence of the two audio peaks.

In Step 403 "IDENTIFY LANDMARK ASSOCIATED IMAGES", images in the digital image stream that correspond in time to the audio landmarks identified in the associated digital audio stream may be captured for image processing.

In Step 404 "REDUCE IMAGES", the landmark associated images obtained in Step 403 may be reduced to simply further image processing. This simplification may allow the use of significantly less powerful image processing computers, or digital processes.

Image reduction may include both reducing the images from color images to gray scale images, and reducing the number of pixels in the image. These processes may be done in either order.

Color to gray scale image reduction may, for instance, reduces the subsequent computational requirements by a factor of 3. This may result because, in digitized RGB color images, each pixel is typically represented as three 8-bit bytes, while in digital gray scale images, each pixel is typically represented by a single 8-bit byte.

Reduction by reducing the number of pixels used to represent the image may result in a reduction of subsequent computation requirements by a factor of 100,000. This is because high definition television images typically have image sizes of either 1920×1080 pixels, or 1280×720 pixels, i.e. about 1-2 million pixels. Meaningfully useful images can be produced by reducing the total number of pixels down to around 100.

In one preferred procedure, both the first and second reduced size images may an N-pixel by M-pixel image in which all the image pixel are of equal size, N and M being positive integers. One arrangement may be for both first and second reduced size image to be an eight-pixel by eight-pixel, equal pixel size, reduced image.

An alternate image reduction procedure may be to reduce the images to foveal reduced images. In such reduced images, the pixel sizes are not all equal. Instead, pixels near the center of the reduced image are smaller, having been averaged from a smaller number of pixels in the original image. Such reduced images be more representative of small changes in the vicinity of the center of the original image.

A foveal reduced image may, for instance, have an N by N pixel core, surrounded by M rings of 2N(N+1) pixels, wherein N and M are positive integers. In one specific, example, the two reduced size images may be foveal reduced image having a 2-pixel by 2-pixel core surrounded by 3 rings of 12 pixels.

In step 406 "IMAGE-COMPARE TO PRODUCE IMAGE-CROSS-COMPARISON", two reduced images obtained by the methods outlined in the proceeding steps may then be image-compared to produce an image-cross-comparison.

Corresponding pixels of each of reduced images may then be compared. For instance, if a pixel from the first reduced image has a value that is greater value than a corresponding pixel from the second reduced image, a "1" may be recorded. However, if the pixel from the first, reduced image has a value that is less than or equal to the corresponding pixel from the second image, a "0" may be recorded. In this way, a binary string, that may also be interpreted as a binary number may be produced that may be the image-cross-comparison.

Alternately, one of the reduced images may first be mirrored, i.e., either the rows, or the columns swapped so that the $1^{st}$ becomes the nth, and the $2^{nd}$ becomes the n−1 th, etc., and the comparison made between corresponding pixels in the first, reduced image and in the second, now mirrored, reduced image. In this way, if the original images are very similar, there is less chance of obtaining a null image-cross-comparison in which all, or most, or the elements of the cross comparison binary string are "1"s.

Such comparisons may be done both if the reduced image is an equal sized pixel reduction, or a foveal image reduction.

If the reduced image is an equal sized pixel reduction, the comparison may also be made between displaced pixels, i.e., pixel (x, y) may be compared to pixel (x+1, y) or to pixel (x, y+1). In this way, if the original images are very similar, there is less chance of obtaining a null image-cross-comparison in which all, or most, or the elements of the cross comparison binary string are "1"s. The amount of the displacement may be any integer, and may warp around so, for example, the last row of pixels may be compared with the other images first row of pixels.

In Step 407 "COMPARE TO MEDIA SEGMENT DATABASE" a media segment database may be examined to determine if the current media segment matches any previously identified media segments. These previous media segments may, for instance, be known entities such as, but not limited to, interstitial commercials. An end user may wish to identify such entities for purpose such as, but not limited to, determining that a particular media segment was aired, or streamed, on a particular channel or media stream on a particular day or time. Or the end user may wish to avoid such entities by, for instance, switching channels when particular media segments are being encountered.

The media segment database may contain one or more previously identified media segments that may be identifiable by their landmark-linked-image-comparison, or characteristic landmark-linked-image-comparisons. These may simply be a combination of a landmark-time and an image-cross-comparison.

By comparing the landmark-time and the image-cross-comparison of the current media segment, found using the methods outlined in the previous steps, with those of the previously identified media segments contained in the media segment database, it may be determined if the current segment matches a previously known segment.

Depending on the application, the match may need to be identical, or it may be sufficient if the matches are with in predetermined ranges.

The matching may proceed by either comparing by first comparing the image-cross-comparisons, and if a sufficiently close image-cross-comparison match is found, then comparing the landmark-times. Or the matching may proceed by first comparing the landmark-times, and if a sufficiently close landmark-times match is found, then comparing the image-cross-comparisons.

If, for instance, the image-cross-comparison is represented as an N-bit binary string, a sufficiently good match may, for instance, be one in which the strings differ by 3, or fewer, of the binary string bits. Or it may be one in which 2%, or fewer, of the bits are different, or it may be one in which 10%, or fewer, of the bits are different.

Similarly, landmark-times may be deemed sufficient close for a match if they are within a predetermined percentage of each other, such as, but not limited to, within 5% of each other.

Once a media segment has been matched, it may be tagged appropriately so that suitable information may also be associated with it. The additional information may be information such as, but not limited to, an identity of a rights holder, an identity of a channel on which the segment was broadcast or streamed, a date and time of such streaming, or some combination thereof. The tag may take a suitable form such as, but not limited to, a URL of an information source, a database address, a contact email address, a contact telephone number, or some combination thereof.

If a match is not found, the method may proceed to Step 409 "DATABASE UPDATE?". The system may, for instance, be being used to identify candidate sequences for some task such as finding new interstitial sequences. If this is so, the method may then proceed to Step 411 "UPDATE DATABASE" in which the database is now updated with a candidate, which may be useful if further sequences match it. If not, the method may proceed to Step 410 "GET NEXT MEDIA SEGMENT" and then loop back to Step 401.

If, however, in Step 408, a match is found, the method may then proceed to Step 410 "IDENTIFY MEDIA STREAM". This may, for instance, involve accessing additional data that may be stored in the media segment database such as, but not limited to, identification of the owners, or rights holders, of the previously identified media segments that has been deemed to be a match.

In Step 413 "TAKE ACTION APPROPRIATE TO IDENTITY", the method may now take an action such as, but not limited to, sending an automated message to an identified rights holder to inform them that their media segment aired on a particular channel at a particular time, or it may be to instruct a media delivery system to switch what media it is delivering.

After performing the appropriate action, the method may then loop back to Step 401 to continue monitoring the digital multimedia stream, looking at appropriate current media segments.

In further embodiments of the invention, the audio peaks may be defined in a variety of ways such as, but not limited to, the two highest audio maxima that occur within a video segment, the two highest audio maxima that occur that occur with a certain time of an event within, or that defines a start or end, of a video segment.

One of ordinary skill in the art will also appreciate that the video segments may be pre-found using techniques such as those used to obtain candidate clips as described in, for instance, U.S. patent application Ser. No. 15/852,389 filed on Dec. 22, 2017 entitled "System for the Augmented Assessment of Virtual Insertion Opportunities", the contents of which are hereby fully incorporated herein by reference.

One of ordinary skill in the art will also appreciate that the inventive methods described above may also be adapted to use audio minimums rather than maximums, or a combination thereof.

Although this invention has been described with a certain degree of particularity, it is to be understood that the present disclosure has been made only by way of illustration and that numerous changes in the details of construction and arrangement of parts may be resorted to without departing from the spirit and the scope of the invention.

The invention claimed is:

1. A method of media segment identification, comprising:
providing a digital processor;
providing an identified media segment database, in functional connection to said digital processor, comprising one or more previously identified media segments, each of said previously identified media segments having an associated landmark-linked-image-comparison, said associated landmark-linked-image-comparison comprising a landmark-time and an image-cross-comparison, said landmark-time being a temporal distance between two audio peaks, and said image-cross-comparison being an image-comparison between a first image associated with a first of said audio peaks and a second image associated with a second of said audio peaks;
obtaining, by said digital processor, a current digital multimedia stream, having a current media segment comprising a digital image stream, and a digital audio stream;
automatically generating, by one or more software modules operable on said digital processor, a landmark-linked-image-comparison for said current media segment;
automatically comparing, by said software module, said obtained landmark-linked-image-comparison with said landmark-linked-image-comparisons in said media stream database; and
if said obtained landmark-linked-image-comparison matches one of said landmark-linked-image-comparisons in said identified media segment database, automatically tagging said current media segment as being equivalent to the identified media segment having said matched landmark-linked-image-comparison.

2. The method of claim 1, wherein, an audio peak is an audio maximum that is a predetermined height greater than any audio level in said digital audio stream in a preceding, predetermined length of time.

3. The method of claim 2, wherein, said predetermined height is 3-times or more as high, and said predetermined time is 0.25 seconds.

4. The method of claim 2, wherein, said image-cross-comparison comprises:

automatically reducing each of said first and second digital images to a reduced size image;

automatically converting each of said reduced size images to a gray scale image; and automatically comparing the value of each of the pixels of the first gray scale image to the value of a pixel in the second gray scale, and recording a 1 if it is greater than or equal, and a 0 if it is less.

5. The method of claim 4, wherein, the pixels in said first gray scale image are compared to corresponding pixels in said second gray scale image.

6. The method of claim 5, wherein, one of said gray scale images is mirrored prior to said comparing.

7. The method of claim 4, wherein the pixels in said first gray scale image are compared to displaced pixels in said second gray scale image.

8. The method of claim 7, wherein the pixels in said first gray scale image are compared to pixels in said second gray scale image displaced by one row.

9. The method of claim 4, wherein, each of said first and second reduced size image is an N-pixel by M-pixel image; said gray scale image has L-color values; and said image-cross-comparison is an M×N-bit binary number, wherein L, M and N are positive integers.

10. The method of claim 4, wherein, each of said first and second reduced size image is an eight-pixel by eight-pixel, equal pixel size image; said gray scale image has 64 color values; and said image-cross-comparison is a 64-bit binary number.

11. The method of claim 4, wherein, each of said first and second reduced size images is a foveal reduced image having an N by N pixel core surrounded by M rings of 2N(N+1) pixels, wherein N and M are positive integers.

12. The method of claim 4, wherein, each of said first and second reduced size images is a foveal reduced image having a 2-pixel by 2-pixel core surrounded by 3 rings of 12 pixels.

13. The method of claim 1, wherein comparing said current landmark unique identifier with associated landmark unique identifiers in said media stream database comprises first comparing said image-cross-comparisons, and if a sufficiently close cross comparison match is found, then comparing said landmark-times.

14. The method of claim 13, wherein a sufficiently close cross comparison match is one in which said cross comparisons are N bit binary strings, and N−3 or more of the binary bits match.

15. The method of claim 14 wherein said cross comparisons are 64-bit binary strings.

16. The method of claim 1, wherein comparing said current landmark unique identifier with associated landmark unique identifiers in said media stream database comprises first comparing said landmark-times, and if a sufficiently close landmark-times match is found, then comparing said image-cross-comparisons.

17. The method of claim 16, wherein said landmark-times are deemed sufficient close for a match if they are within 5% of each other.

* * * * *